United States Patent [19]

Gallaro et al.

[11] 4,451,504

[45] May 29, 1984

[54] PROCESS FOR APPLYING PHOSPHOR TO THE APERTURE MASK OF A CATHODE RAY TUBE

[75] Inventors: Anthony V. Gallaro, Auburn; Gordon T. Foreman, Seneca Falls, both of N.Y.

[73] Assignee: North American Philips Consumer Electronics Corp., New York, N.Y.

[21] Appl. No.: 496,358

[22] Filed: May 20, 1983

[51] Int. Cl.$^3$ .......................... B05D 3/02; B05D 1/32; B05D 1/02
[52] U.S. Cl. ......................................... 427/64; 427/68
[58] Field of Search ..................................... 427/64, 68

[56] References Cited

U.S. PATENT DOCUMENTS 4,117,177  9/1978  Schlafer .............................. 427/68 X

*Primary Examiner*—James R. Hoffman
*Attorney, Agent, or Firm*—Thomas A. Briody; Jack Oisher; John C. Fox

[57] ABSTRACT

Fine particle size phosphors are adhered to the back of the aperture mask of a cathode ray tube by spraying a dispersion of such particles in a coating vehicle containing a temporary binder, and baking to remove the binder. The adhered phosphor is useful in providing information about the location of the scanning electron beams during tube operation.

11 Claims, No Drawings

PROCESS FOR APPLYING PHOSPHOR TO THE APERTURE MASK OF A CATHODE RAY TUBE

BACKGROUND OF THE INVENTION

This invention relates to a process for applying phosphur to the aperture mask of a cathode ray tube, and more particularly relates to a process for selectively applying phosphor to the mask using an aqueous-soluble coating composition.

Cathode ray tubes enjoying the widest use today, primarily in color television, employ color selection electrodes of relatively thin, fragile multi-apertured metal masks. These "aperture masks" are positioned adjacent the patterned phosphor screen on the inside surface of the glass viewing panel, and direct the three scanning electron beams from the electron gun to the respective red, blue and green phosphor areas on the screen.

In certain specialized applications, it is desired to have phosphor also applied to the back or gun side of the aperture mask, so that in scanning the mask and screen, the electron beams will strike and excite this phosphor, causing emissions back in the direction of the gun. Such emmissions can be detected and used, for example, to gain information about and control the location of the scanning electron beams. For this purpose, it has been found advantageous to have the phosphor selectively applied to the mask in a critical, predetermined pattern.

The technology for applying the red, green and blue-emitting phosphors to the inside surface of the glass viewing panel is well developed. It is based upon a photolithographic technique in which each of the three phosphor patterns is formed by light exposure of a phosphor-photoresist layer through the aperture mask. Subsequent development and baking of the exposed layer leaves an adherent pattern of phosphor particles on the glass panel.

In contrast, there is no generally accepted technique for applying a phosphor pattern to the mask. Various considerations arise, due to the unique nature of the application. The mask is metallic, relatively fragile and expensive to fabricate. Also, since it is used as the photolithographic "negative" during formation of the phosphor screen on the viewing panel, it becomes "married" to that screened panel. Thus, any subsequent damage to the mask results in rejection not only of the mask but also of the panel. Finally, the mask apertures must be relatively small in size and large in number to produce the desired resolution for high quality display images on the viewing screen. Even partial blocking of the apertures could result in decreased brightness of the image. Any phosphor pattern on the mask which bridges individual apertures risks the possibility of blocking of these apertures during pattern application.

SUMMARY OF THE INVENTION

Accordingly, it is an object of the invention to provide a process for producing an adherent phosphor pattern on the back of the aperture mask of a cathode ray tube, without damaging the mask or blocking the apertures. Another object of the invention is the easy removal of a rejected pattern from the mask, so that the mask may be salvaged and a new pattern applied.

These and other objects are achieved by a process in which the mask is coated with a dispersion of fine particle size phosphors in an aqueous-soluble coating vehicle containing a dispersant and a temporary binder, and the applied coating is subsequently baked to remove the vehicle and leave an adherent layer of phosphor on the mask.

The coating composition is preferably produced by milling the phosphor particles with the coating vehicle to produce a liquid dispersion of fine particle size phosphor.

Preferably, the coating composition is sprayed onto the mask through a stencil in contact with the mask. The stencil is then removed, the mask and its mated screened panel are assembled, and the mask-screened panel assembly is sealed to a fritted glass funnel by baking. This baking not only melts the frit, but also removes the coating vehicle from the sprayed coating on the mask leaving an adherent patterned phosphor layer, and avoiding the necessity for a separate baking step.

The coating composition may be readily removed by a neutral or alkaline aqueous wash prior to baking, so that rejected masks are easily salvaged and reprocessed.

DESCRIPTION OF THE PREFERRED EMBODIMENT

For a fuller understanding of the present invention, together with other and further objects, advantages and capabilities thereof, reference is made to the following disclosure and appended claims.

The composition used for coating of the aperture mask must contain fine particle size phosphors, in order to avoid a coarse texture in the applied phosphor layer, which could result in either partially or totally blocked mask apertures, or poor adherence, or both. In addition, the phosphor particles must be well dispersed in the coating composition to insure uniformity of application and of emission upon later excitation by the scanning electron beams.

Such fine particle size dispersions may be achieved by milling the selected phosphor composition with a liquid vehicle for a time sufficient to achieve significant reduction of phosphor particle size. For example, a beginning average particle size of about 7 to 9 microns may be reduced to about 0.5 to 2.5 microns after milling for about 15 to 25 hours.

The particular phosphor chosen will, of course, depend on the application and especially upon the type and sensitivity of the emission detector chosen. A cerium-activated yttrium silicate ($Y_2Si_2O_5:Ce$) has been found to be particularly suitable for use with UV emission detectors, such as photomultiplier tubes. It may also be advantageous for process control to include a small amount of a "tracer" phosphor, which is easily excited and detected during manufacture, such as by hand-held UV units. Such a tracer phosphor is particularly useful for detecting non-uniform coatings. An exemplary tracer phosphor is the red-emitting europium-activated yttrium vanadate ($YVO_4:Eu$), which may be present in an amount ranging from about ½ to 10 weight percent of the phosphor composition.

Particularly suitable as a base for the coating vehicle is a mixture of ethyl and butyl alcohol, their ratio being determined by the desire to obtain a smooth and uniform coating. The butyl alcohol, being of higher molecular weight, tends to retard drying time of the applied coating, thus enhancing flowability. The weight ratio of ethyl to butyl alcohol is typically about 1.3:1 to 1:1, but may range from 2:1 to 0.6:1, depending upon the amounts of other constituents present and the coating characteristics desired.

The coating vehicle also contains a dispersant, to keep the phosphor particles separated and suspended in the vehicle. Some suitable dispersants are Marasperse N-22 and CB (lignosulfate-based dispersants marketed by American Can Company), DAXAD (sulfonic acid-based dispersants marketed by W. R. Grace & Company), and Triton X-100 (marketed by Rohm & Haas Co.). Marasperse N-22 is preferred. The amount of dispersant in the coating composition may range from about 0.05 to 1 or more weight percent, the particular amount required increasing with the amount of solids (phosphor particles) present in the coating vehicle.

A small amount of a binder is added to the composition as a film former. Enough binder must be added to obtain adequate green strength of the applied coating prior to baking, but an excess tends to reduce cohesion of the coating during application, due, for example, to loose particles caused by excess buildup on the application stencil.

One such binder which has been found suitable is polyvinyl pyrrolidine (PVP). Generally, from one-half to five weight percent of solid PVP in the coating composition is adequate for the above purpose. PVP is conveniently added in the form of a 28 percent by weight aqueous solution, and is preferably added after milling in order to avoid any tendency of the PVP to induce foaming during milling.

Another suitable binder is hydrolyzed tetra ethyl ortho silicate (HTEOS). Since tetra ethyl ortho silicate will not mix with water, it is usually hydrolyzed in a mutual solvent such as ethyl alcohol, isopropyl alcohol or their binary azeotropes with water. A suitable procedure is to add anhydrol (denatured ethyl alcohol) to the tetra ethyl ortho silicate, then gradually add a dilute aqueous solution of a mineral acid, such as nitric acid or hydrochloric acid, to the mixture to initiate a reaction, and then allow the reaction to proceed to completion. The amount of acid solution should, in general, not exceed about 15 percent by volume of the tetra ethyl ortho silicate, beyond which the solution tends to become unstable and precipitation of silicate becomes likely. Generally, from about 3.5 to 17.5 weight percent of binder in the coating composition (expressed as tetra ethyl ortho silicate prior to hydrolysis) is adequate, and may be conveniently added to the composition prior to or after milling, preferably prior to milling to promote intimate contact of the phosphor particles with the binder.

Unlike PVP, which is a temporary binder and is substantially completely removed during the subsequent baking step, the silica in the HTEOS remains behind after baking, in amounts sufficient to enhance bonding of the phosphor coating, but insufficient to appreciably reduce the phosphor light output.

If a defect occurs in the coating operation prior to baking, the PVP-containing composition may be completely removed during an aqueous wash, while the HTEOS-containing composition may be completely removed using a dilute aqueous solution of a strong alkali (for example 5 weight percent sodium hydroxide solution) as a wash.

An important consideration in the formulation of the coating is the ratio of suspended solids (phosphor) to liquid (vehicle base, dispersant and binder). There should be sufficient solids present to obtain a baked phosphor layer capable of an emission signal adequate for detection, with minimum risk of blocked apertures. In general, the amount of solids will be from about 6 to 6.5 weight percent of the total composition, but may range from about 5 to 8.5 weight percent.

The resulting coating may be painted, sprayed or otherwise applied to the mask, preferably through a stencil to achieve a desired pattern. The applied coating is allowed to air dry and then baked sufficiently to remove the volatile constituents, preferably as part of the frit-sealing operation of cathode ray tube manufacture, which is typically at a temperature of from about 360° C. to 450° C., for about 0.75 to 1.5 hours.

Some typical examples of the process of the invention will now be given.

EXAMPLE 1

The following materials were mixed together and ball milled overnight (17 hours) in a ½ pint ball mill containing 20 burundum cylinders ½"×½" in size:

5 grams P-47 phosphor ($Y_2Si_2O_5$:Ce) (about 8 microns average particle size)

0.22 grams $YVO_4$:Eu phosphor (0.5 micron average particle size)

0.11 grams N-22 dispersant 45 grams ethyl alcohol 35 grams butyl alcohol

The milled mixture was then transferred to a clean, dry bottle and 5.6 grams of a 28 weight percent aqueous solution of PVP was introduced with a magnetic stirrer. This composition was then sprayed onto the back of an aperture mask through a stencil, allowed to air dry and then baked at 450° C. for 1 hour. Although the PVP and other volatile constituents were removed during baking, the fine particle size phosphor (1.5 microns average particle size) adhered well enough to the mask to withstand an ultrasonic wash. This fine particle size also minimizes the possibility of any decrease in aperture size as a result of the coating process.

EXAMPLE 2

HTEOS was prepared in the following manner. Thirty-two (32) milliliters of anhydrol (denatured ethyl alcohol) was added to and mixed with 60 milliliters of tetra ethyl ortho silicate. To this mixture was added 8 milliliters of dilute nitric acid (made by mixing 8 milliliters of concentrated nitric acid with 492 milliliters of deionized water) drop wise while stirring. The solution became exothermic, indicating the reaction was proceeding. The mixture was allowed to stand overnight.

The following materials were then mixed together and ball milled overnight (17 hours) in a ½ pint ball mill containing 20 burundum cylinders ½"×½" in size:

6.5 grams P-47 phosphor ($Y_2Si_2O_5$:Ce) (about 8 microns average particle size)

0.26 grams $YVO_4$:Eu phosphor (0.5 micron average particle size)

0.20 grams N-22 dispersant 12.5 grams HTEOS (as prepared the previous day)

30 grams ethyl alcohol 35 grams butyl alcohol

The milled mixture was then transferred to a clean, dry bottle and the composition was then sprayed onto the back of an aperture mask through a stencil, allowed to air dry and then baked at 450° C. for 1 hour. Although the volatile constituents were removed during baking, the fine particle size phosphor (1.5 microns average particle size) adhered well enough to the mask to withstand an ultrasonic wash. This fine particle size also minimizes the possibility of any decrease in aperture size as a result of the coating process.

If the defect occurs in the spray operation prior to baking, the coating may be removed with a dilute (eg., 5 weight percent) solution of sodium hydroxide, rinsed with water, dried and resprayed.

We claim:

1. A process for applying phosphor to the aperture mask of cathode ray tube, the process comprising the steps of:
   (a) coating at least a portion of the mask with a composition comprising a dispersion of fine particle size phosphor in a binder-containing coating vehicle; and
   (b) baking the aperture mask to remove the vehicle and leave an adherent phosphor layer on the mask.

2. The process of claim 1 wherein the binder is polyvinyl pyrrolidine.

3. The process of claim 2 wherein the coating composition is produced by first producing a dispersion of phosphor particles in a vehicle comprising ethyl alcohol, butyl alcohol and a disperant, and then adding the binder.

4. The process of claim 1 wherein the binder is hydrolyzed tetra ethyl ortho silicate.

5. The process of claim 4 wherein the dispersion of phosphor particles is produced in a vehicle comprising ethyl alcohol, butyl alcohol, a dispersant and the binder.

6. The process of claim 1 wherein the coating is applied to the mask by spraying.

7. The process of claim 1 wherein the coating is applied to the mask through a stencil in contact with the mask.

8. The process of claim 1 wherein baking is carried out at a temperature of from 360° to 450° C. for from 0.75 to 1.5 hours.

9. The process of claim 1 wherein baking is carried out during frit-sealing of the mask-panel assembly to the funnel of the cathode ray tube.

10. The process of claim 1 wherein the weight percent of phosphor particles to coating vehicle is in the range of from 5 to 8.5.

11. The process of claim 1 wherein the average size of the phosphor particles is in the range of about 0.5 to 2.5 microns.

* * * * *